3,504,160
FILLED WELDING WIRE FOR THE ELECTRIC ARC WELDING IN A PROTECTIVE GAS ATMOSPHERE
Wilhelmus Gerardus Essers, Gerardus Jelmorini, and Gerrit Willem Tichelaar, Emmasingel, Eindhoven, Netherlands, assignors, by mesne assignments, to U.S. Philips Corporation, New York, N.Y., a corporation of Delaware
Filed Sept. 9, 1968, Ser. No. 758,459
Claims priority, application Netherlands, Sept. 12, 1967, 6712434
Int. Cl. B23k 35/22
U.S. Cl. 219—146          5 Claims

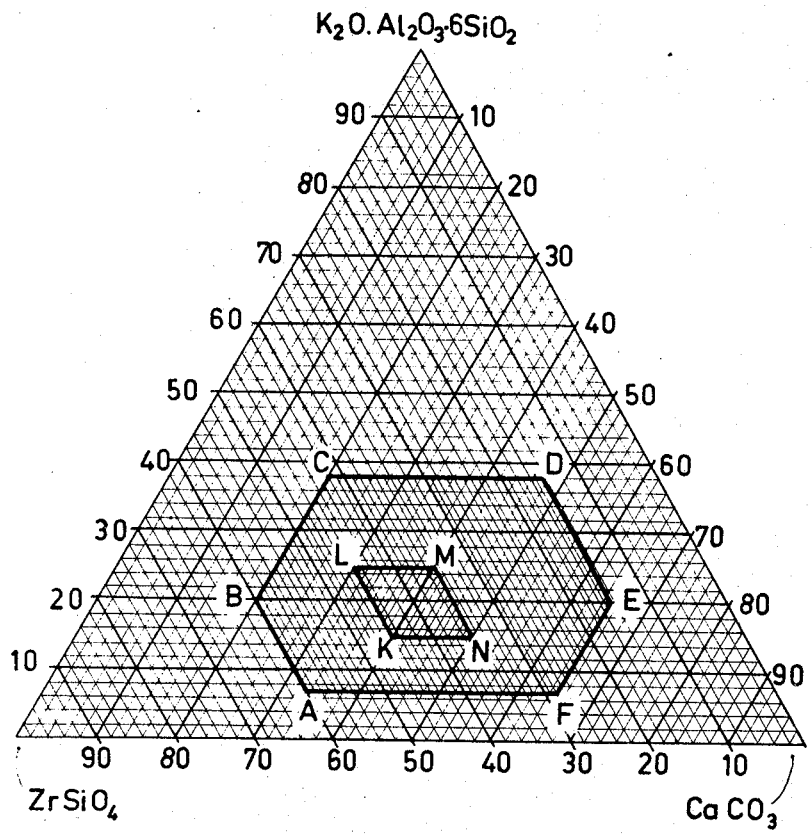

ABSTRACT OF THE DISCLOSURE

The invention relates to a welding wire for electric arc welding of steel in a protective gas atmosphere, which welding wire consists of a metal sheath and a filling which contains 6–10% by weight of slag forming ingredients, which ingredients mainly constitute by weight of the slag-forming ingredients, 0–40% zirconium dioxide, 15–60% zirconium silicate, 7–38% potash feldspar and 20–65% calcium carbonate.

---

The invention relates to a welding wire for the electric arc welding of steel in a protective gas atmosphere and, for example in a carbon dioxide-containing protective gas atmosphere, the wire consisting of a metal sheath on the basis of iron and a filling which contains slag-forming constituents.

Similar welding wires, hereinafter named filled welding wires, are known. Filled welding wires for the electric arc welding of steel in a carbon dioxide-containing atmosphere have been described, the slag-forming constituents of the filling of which consists mainly of titanium dioxide and silicon dioxide. The weldability of these known wires is good. The mechanical properties of the welding metal, for example, the notch impact strength, are often insufficient for use at lower temperatures.

Filled welding wires for the electric arc welding of steel in a carbon dioxide-containing atmosphere have also been described, in which the slag-forming constituents are mainly calcium carbonate and calcium fluoride. Welds obtained with such wires have a good notch impact strength. Measurements of the notch impact strenth at low temperatures, however, give a rather large spreading of this quantity. The weldability of these wires is unsatisfactory inter alia by the occurrence of large droplets and sputters.

A new filled welding wire for the electric arc welding of steel in a protective gas atmosphere has now been found. The above-mentioned drawbacks do not occur in welding with this welding wire.

The invention relates to a filled welding wire for the electric arc welding of steel in a protective gas atmosphere, which welding wire consists of a metal sheath on the basis of iron and a filling core which comprises calcium-carbonate-containing slag-forming constituents, and is characterized in that the slag-forming constituents of the filling core contain 0–40% by weight (calculated on the total amount of the slag-forming constituents) of zirconium dioxide and furthermore mainly consist of zirconium silicate, potash feld-spar and calcium carbonate of a composition lying in a range of compositions which in the system zirconium silicate-potash feldspar-calcium carbonate, considered as a ternary system is given by a hexagon ABCDEF (see figure) the corners A, B, C, D, E and F of which are given by the following compositions (in percent by weight):

A—60 zirconium silicate, 7 potash feldspar and 33 calcium carbonate.
B—60 zirconium silicate, 20 potash feldspar and 20 calcium carbonate.
C—42 zirconium silicate, 38 potash feldspar and 20 calcium carbonate.
D—15 zirconium silicate, 38 potash feldspar and 47 calcium carbonate.
E—15 zirconium silicate, 20 potash feldspar and 65 calcium carbonate.
F—28 zirconium silicate, 7 potash feldspar and 65 calcium carbonate, and that the content of slag-forming constituents is 6–10% by weight (calculated on the welding wire).

A preferred embodiment of a filled welding wire according to the invention is that in which the composition of the part of the slag-forming constituents consisting of zirconiumsilicate, potash feldspar and calcium carbonate lies in a range of compositions which, in the system zirconium silicate-potash feldspar-calcium carbonate considered as a ternary system, is a quadrangle KLMN (see figure) the corners K, L, M and N of which are given by the following compositions (in percent by weight):

K—45 zirconium silicate, 15 potash feldspar and 40 calcium carbonate.
L—45 zirconium silicate, 25 potash feldspar and 30 calcium carbonate.
M—35 zirconium silicate, 25 potash feldspar and 40 calcium carbonate.
N—35 zirconium silicate, 15 potash feldspar and 50 calcium carbonate.

Welding wires according to this embodiment have very good welding properties, produce welds with a very beautiful appearance, show few or hardly any sputtering, and the welds obtained with said wires have a good notch impact strength at low temperatures with low spreading.

This applies in particular to those welding wires, which contain also 15 to 30% by weight (calculated on the total amount of the slag-formed constituents) of zirconium dioxide ($ZrO_2$). The addition of zirconium dioxide has a favourable influence on the protection by slag of the weld bead. The same result is achieved by the addition of ferrozirconium, which contains, for example, 40% of iron, in a quantity of 0.1–1.5% by weight (calculated on the welding wire) and preferably 0.5 to 1.5% by weight.

The welding properties and the properties of the welds obtained with a filled welding wire according to the invention are generally optimum with wires the content of slagforming constituents of which is 6.5–8.0% by weight (calculated on the welding wire).

In addition to the slag-forming constituents the filling of the welding wire may contain constituents used in filled welding wires, for example, iron powder, alloy constituents, for example, nickel, chromium or molybdenum in powder form and deoxidizing elements, for example, silicon and manganese, for example, in the form of powdered ferrosilicon and ferromanganese.

In order that the invention may be readily carried into effect, it will now be described in greater detail with reference to the ensuing specific examples.

The welding wire consists of a soft steel (wall thickness 0.3 mm.), diameter 2.2 mm. The filling contains (in percent by weight calculated on the welding wire): 2.1% manganese, 1.0% silicon, 30% iron powder, 2.6% zirconium silicate, 1.3% potash feldspar and 2.6% calcium carbonate.

Welds have been made with this wire in a carbon dioxide atmosphere. Small droplets, good slag protection, weld with smooth and set appearance. Arc voltage 28 volt, current strength 400 amp. Of a 4-run-weld, test pieces have been made for determining the notch impact strength (Charpy V-notch) at different temperatures. The results are:

| Temperature (in ° C.) | Notch impact strength (kg./cm.$^2$) |
| --- | --- |
| +20 | 15.6 |
| −30 | 7.3 |
| −50 | 6.2 |

OTHER EXAMPLES

Welding tests as described in Example 1 have been carried out with other welding wires according to the invention. Corresponding results were obtained. Welding has taken place in carbon dioxide, in argon and in a gas mixture consisting of 80% by volume of argon and 20% by volume of carbon dioxide, and of 80% by volume of argon, 15% by volume of carbon dioxide and 5% by volume of oxygen.

The test have been carried out with welding wires (a, b, c and d) the fillings of which contained (contents expressed in percent by weight calculated on the welding wire) the substances stated in the table. The sheath was of soft steel (wall thickness 0.3 mm.); thickness of the wire 1.6–2.4 mm.

TABLE

|  | a | b | c | d |
| --- | --- | --- | --- | --- |
| Manganese | 2.0 | 2.2 | 2.2 | 2.2 |
| Silicon | 0.9 | 0.8 | 0.8 | 0.8 |
| Iron powder | 30 | 26 | 32 | 28 |
| Zirconium silicate | 2.1 | 2.2 | 1.7 | 1.6 |
| Potash feldspar | 1.1 | 1.2 | 0.9 | 1.4 |
| Calcium carbonate | 2.1 | 1.5 | 2.1 | 1.6 |
| Zirconium oxide | | 1.5 | 1.8 | 2.1 |
| Ferrozirconium | 0.8 | | | |

In these documents the term potash feldspar is used for a mineral substantially consisting of a compound of the formula $K_2O \cdot Al_2O_3 \cdot 6SiO_2$.

What is claimed is:

1. A filled welding wire for the electric arc welding of steel in a protective gas atmosphere, which welding wire consists of a metal sheath primarily consisting of iron and a filling which contains calcium carbonate-containing slag-performing constituents, characterized in that the slag-forming constituents of the filling contain 0–40% by weight, calculated on the total amount of the slag-forming constituents, of zirconium dioxide and in addition mainly consist of zirconium silicate, potash feldspar and calcium carbonate of a composition lying in a range of compositions which in the system zirconium silicate-potash feldspar-calcium carbonate which is considered as a ternary system, is a hexagon ABCDEF, see figure, the corners A, B, C, D, E and F of which are given by the following compositions, in percent by weight:

A—60 zirconium silicate, 7 potash feldspar, 33 calcium carbonate.
B—60 zirconium silicate, 20 potash feldspar and 20 calcium carbonate.
C—42 zirconium silicate, 38 potash feldspar and 20 calcium carbonate.
D—15 zirconium silicate, 38 potash feldspar and 47 calcium carbonate.
E—15 zirconium silicate, 20 potash feldspar and 65 calcium carbonate.
F—28 zirconium silicate, 7 potash feldspar and 65 calcium carbonate.

and that the content of slag forming constituents is 6–10% by weight, calculated on the welding wire.

2. A filled welding wire as claimed in claim 1, characterized in that the composition of the slag-forming constituents of zirconium silicate, potash feldspar and calcium carbonate lies in a range of compositions which in the system zirconium silicate-potash feldspar-calcium carbonate which is considered as a ternary system, is a quadrangle KLMN, see figure, the corners K, L, M and N of which are given by the following compositions in percent by weight:

K—45 zirconium silicate, 15 potash feldspar and 40 calcium carbonate.
L—45 zirconium silicate, 25 potash feldspar and 30 calcium carbonate.
M—35 zirconium silicate, 25 potash feldspar and 40 calcium carbonate.
N—35 zirconium silicate, 15 potash feldspar and 50 calcium carbonate.

3. A filled welding wire as claimed in claim 2, characterized in that the slag-forming constituents of the filling contain 15 to 30% by weight of zirconium dioxide, calculated on the total amount of the slag-forming constituents.

4. A filled welding wire as claimed in claim 3, characterized in that the content of slag-forming constituents is 6.5–8.0% by weight, calculated on the welding wire.

5. A filled welding wire as claimed in claim 4, characterized in that the filling contains 0.5–1.5% by weight of ferrozirconium.

References Cited

UNITED STATES PATENTS 1,953,942   4/1934   Applegate _____ 219—146
3,185,599   5/1965   Stuttgart et al. _____ 148—26

JOSEPH V. TRUHE, Primary Examiner
L. A. ROUSE, Assistant Examiner